(12) United States Patent
Helfer

(10) Patent No.: US 12,510,187 B2
(45) Date of Patent: Dec. 30, 2025

(54) MULTI-STAGE SHAFT SEAL

(71) Applicant: FISHER CONTROLS INTERNATIONAL LLC, Marshalltown, IA (US)

(72) Inventor: Wade Helfer, Ames, IA (US)

(73) Assignee: Fisher Controls International LLC, Marshalltown, IA (US)

(*) Notice: Subject to any disclaimer, the term of this patent is extended or adjusted under 35 U.S.C. 154(b) by 0 days.

(21) Appl. No.: 18/326,749

(22) Filed: May 31, 2023

(65) Prior Publication Data
US 2024/0401717 A1 Dec. 5, 2024

(51) Int. Cl.
*F16K 3/24* (2006.01)
*F16K 3/22* (2006.01)
*F16K 3/30* (2006.01)
*F16K 41/04* (2006.01)

(52) U.S. Cl.
CPC .............. *F16K 41/046* (2013.01); *F16K 3/22* (2013.01); *F16K 3/30* (2013.01)

(58) Field of Classification Search
CPC .............................. F16K 3/243; F16K 41/046
See application file for complete search history.

(56) References Cited

U.S. PATENT DOCUMENTS

| | | | | |
|---|---|---|---|---|
| 4,475,712 A * | 10/1984 | DeJager | ................ | F16K 5/0285 251/86 |
| 5,056,758 A * | 10/1991 | Bramblet | .............. | F16K 41/046 277/513 |
| 5,263,682 A * | 11/1993 | Covert | .................. | F16K 41/046 277/517 |
| 5,799,928 A * | 9/1998 | Siver | ...................... | F16K 5/0605 251/192 |
| 2013/0284963 A1* | 10/2013 | Crochet, Sr. | .......... | F16K 1/2268 251/306 |
| 2016/0265688 A1* | 9/2016 | Yang | ...................... | F16K 49/005 |
| 2016/0363237 A1* | 12/2016 | Fan | ........................ | F16K 1/2268 |
| 2021/0010614 A1* | 1/2021 | Buckner | ............... | F16K 41/043 |
| 2023/0332717 A1* | 10/2023 | Allen | ..................... | F16K 41/046 |

OTHER PUBLICATIONS

Fisher ENVIRO-SEAL and HIGH-SEAL Packing Systems for Sliding-Stem Valves (Live-Loaded); Sliding-Stem Live-Loaded Packing Product Bulletin 59.1:01; Aug. 2021.
Masoneilan Low-E Packing Series Technical Specifications Rev. B—Dec. 2019.
Masoneilan Low-E Packing Series Technical Specifications Rev. C—May 2020.

* cited by examiner

Primary Examiner — Paul J Gray
(74) Attorney, Agent, or Firm — Mackey Law Firm PLLC

(57) ABSTRACT

A valve can include a valve body, a rotatable gate, a neck extending from the valve body, a shaft extending from the rotatable gate and through the neck, and a seal assembly configured to rotatably seal the shaft to the neck. The seal assembly can include a first stage seal having a first working temperature and coupled to the shaft at a first stage seal location, and a second stage seal having a second working temperature and coupled to the shaft at a second stage seal location farther from the valve body than the first stage seal location. The first working temperature can be higher than the second working temperature, and the seal locations and the first stage seal can be configured to prevent a second stage operating temperature at the second stage seal location from exceeding the second working temperature.

20 Claims, 5 Drawing Sheets

MULTI-STAGE SHAFT SEAL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention. The present disclosure relates generally to shaft seals and more specifically relates to shaft seals for valves.

DESCRIPTION OF THE RELATED ART

It can be challenging to maintain a tight seal to atmosphere in high temperature and/or high cycle applications. For example, in some continuous catalyst regeneration processes, the process temperature can hover around 1000 degrees fahrenheit. Many polymer sealing materials cannot withstand such temperatures. Additionally, some continuous catalyst regeneration processes use small aluminum oxide catalyst beads that fracture over time. These fractured, hard pieces can end up working their way in between the shaft and packing rings, which can accelerate the wear rate of a graphite packing set and cause leakage.

BRIEF SUMMARY OF THE INVENTION

Applicant has created new and useful devices, systems and methods for shaft seals, such as for quarter-turn valves. In at least one embodiment, a valve can include a valve body having an input port, an output port and a flow path there between, a rotatable gate, wherein the rotatable gate allows flow between the input port and the output port in a first position and blocks flow between the input port and the output port in a second position, a neck extending from the valve body, wherein the neck has a first end coupled to the valve body, a second end longitudinally opposite the first end, a bore, and an internal shoulder, a shaft disposed through the bore of the neck, wherein the shaft has a central longitudinal axis, a first end coupled to the rotatable gate and a second end longitudinally opposite the first end of the shaft, and wherein the shaft can be selectively operable to rotate the rotatable gate between the first position and the second position, and a seal assembly configured to rotatably seal the shaft to the neck.

In at least one embodiment, a seal assembly can include a first stage seal having a first working temperature, wherein the first stage seal is sealingly coupled to the shaft at a first stage seal location located a first stage distance from the internal shoulder of the neck, and a second stage seal having a second working temperature, wherein the second stage seal is sealingly coupled to the shaft at a second stage seal location located a second stage distance from the internal shoulder of the neck. The second stage distance can be greater than the first stage distance, and the first working temperature can be higher than the second working temperature. The first stage distance, the second stage distance and the first stage seal can be collectively configured to at least partially prevent a second stage operating temperature at the second stage seal location from exceeding the second working temperature.

In at least one embodiment, the first and second working temperatures can be the maximum continuous service temperatures of the first and second stage seals, respectively. In at least one embodiment, the valve can have a flow path operating temperature of at least 1000 degrees fahrenheit within the flow path, and the first stage distance can be configured to maintain, at the first stage seal location, a first stage operating temperature of at least 300 degrees fahrenheit. In at least one embodiment, the first stage distance, the second stage distance and the first stage seal can be collectively configured to prevent the second stage operating temperature at the second stage seal location from exceeding 400 degrees fahrenheit.

In at least one embodiment, the first stage seal can include a graphite sealing ring and the second stage seal can include a polymer sealing ring. In at least one embodiment, the first stage seal can be closer to the internal shoulder of the neck than any other seal of the seal assembly. In at least one embodiment, a packing box ring can be disposed about the shaft longitudinally between the first stage seal and the internal shoulder of the neck. In at least one embodiment, a first guide bushing can be disposed about the shaft longitudinally between the first stage seal and the second stage seal.

In at least one embodiment, a valve or seal assembly can include a packing follower disposed about the shaft longitudinally between the second stage seal and the second end of the neck, and a second guide bushing disposed about the shaft longitudinally between the packing follower and the second end of the neck. The first guide bushing and the second guide bushing can be configured to cooperate to align the shaft within the neck. In at least one embodiment, the second guide bushing can have a lower end configured to couple with an upper end of the packing follower. In at least one embodiment, one of the lower end of the second guide bushing and the upper end of the packing follower can include an outwardly extending flange and the other of the lower end of the second guide bushing and the upper end of the packing follower can include a seat configured to receive at least a portion of the outwardly extending flange.

In at least one embodiment, a valve or seal assembly can include a third stage seal. The third stage seal can include a third stage dynamic seal sealingly coupled to the shaft, and the seal assembly can be configured to compress at least a portion of the third stage dynamic seal between the lower end of the second guide bushing and the upper end of the packing follower. In at least one embodiment, the third stage dynamic seal can include a ring seal having an outwardly extending flange, and the outwardly extending flange can be configured to sealingly engage the lower end of the second guide bushing and the upper end of the packing follower.

In at least one embodiment, a ring seal can include an annular flange that extends downwardly from the outwardly extending flange. In at least one embodiment, the annular flange can include a downwardly facing end and an annular groove disposed in the downwardly facing end, and the downwardly facing groove can be disposed within a bore of the packing follower and in fluid communication with a pressurized fluid downstream of the second stage seal. In at least one embodiment, the third stage seal can include a third stage static seal sealingly coupled to a radially outside surface of the packing follower and a radially inside surface of the bore of the neck.

In at least one embodiment, a valve or seal assembly can include a third stage dynamic seal having a third working temperature. The third stage dynamic seal can be sealingly coupled to the shaft at a third stage seal location located a third stage distance from the internal shoulder of the neck, and the third stage distance can be greater than the second stage distance. In at least one embodiment, the first working temperature can be higher than the third working temperature, and the first stage distance, the second stage distance, the third stage distance, the first stage seal and the second stage seal can be collectively configured to prevent a third stage operating temperature at the third stage seal location from exceeding the third working temperature. In at least one embodiment, the third working temperature can be less than or equal to the second working temperature.

In at least one embodiment, a valve or seal assembly can include one or more springs disposed about a radially outside surface of the second guide bushing and configured to be longitudinally compressed between at least a portion of the second guide bushing and a packing flange coupled to the second end of the neck. In at least one embodiment, a spring can be a Belleville spring. In at least one embodiment, the spring, the first guide bushing and the second guide bushing can be configured to cooperate to translate an axial load into a uniform radial load acting on at least one of the first stage seal, the second stage seal and a combination thereof. In at least one embodiment, a valve or a seal assembly can include one or more anti-extrusion rings disposed about the shaft. One or more anti-extrusion rings can include an anti-extrusion ring disposed at least one of longitudinally between the first stage seal and the internal shoulder of the neck, longitudinally between the first stage seal and the second stage seal, longitudinally between the second stage seal and the second end of the neck, and a combination thereof.

DETAILED DESCRIPTION OF THE INVENTION

Figure 1:
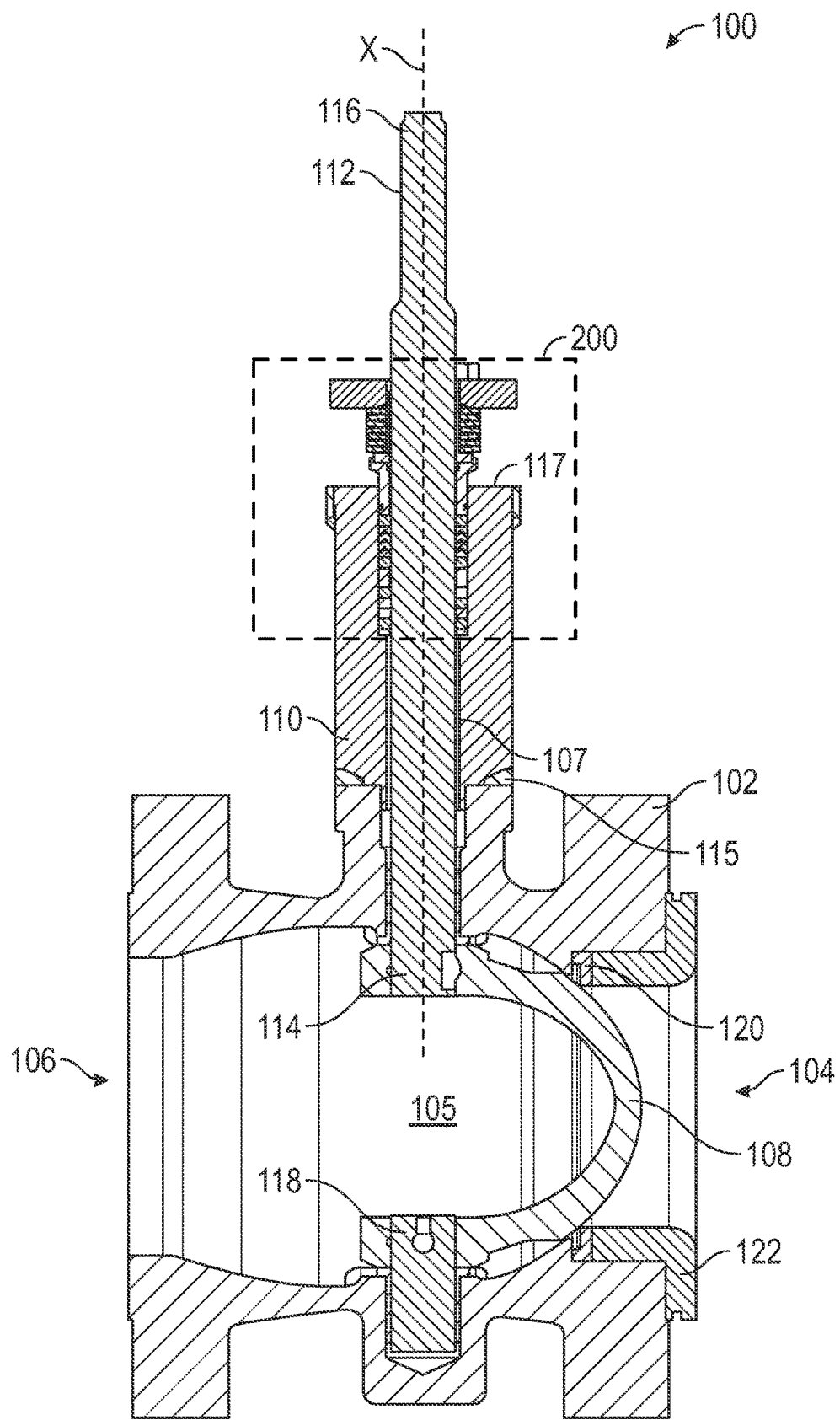
FIG. 1 is a sectional view of one of many embodiments of a valve according to the disclosure.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Applicant has created new and useful devices, systems and methods for shaft seals, such as for quarter-turn valves. In at least one embodiment, a valve can include a valve body, one or more inlet and/or outlet ports, a rotatable gate for controlling flow through the valve, a neck extending from the valve body, a shaft coupled to the gate, and a seal assembly configured to rotatably seal the shaft to the neck. In at least one embodiment, the seal assembly can include a plurality of seals coupled to the shaft and advantageously configured for helping maximize performance of the seal assembly, which can include a first stage seal having a higher working temperature than that of one or more subsequent stage seals. In at least one embodiment, a seal assembly can be advantageously configured for helping extend the functional life of one or more seals, and/or for allowing for more convenient or less time consuming maintenance or replacement of one or more seal assembly components.

Figure 2:
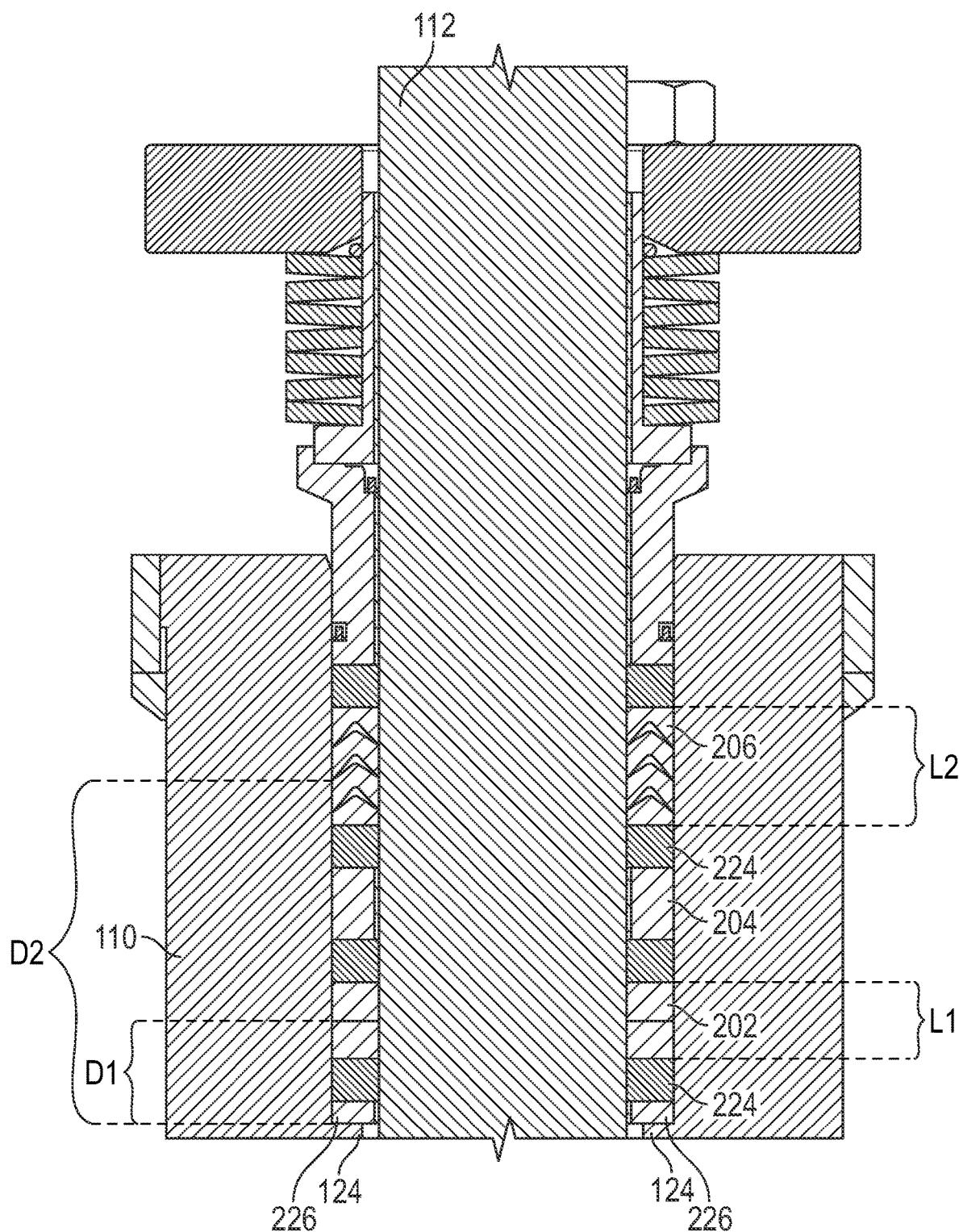
FIG. 2 is a partial sectional view of one of many embodiments of a valve according to the disclosure.
Figure 3:
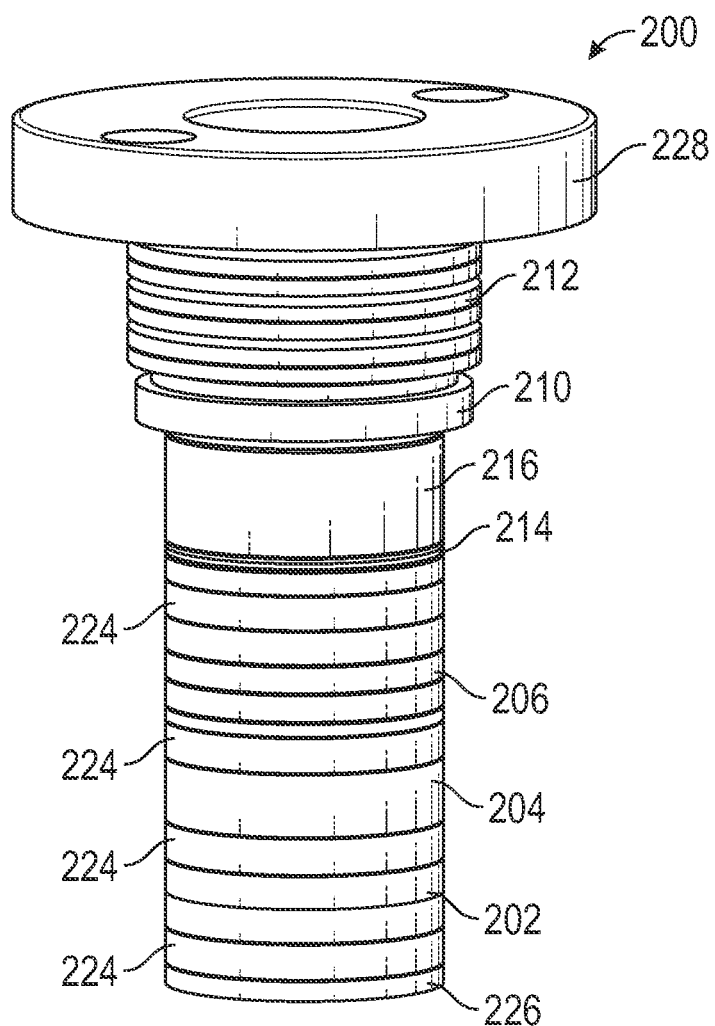
FIG. 3 is a perspective view of one of many embodiments of a shaft seal assembly according to the disclosure.
Figure 4:
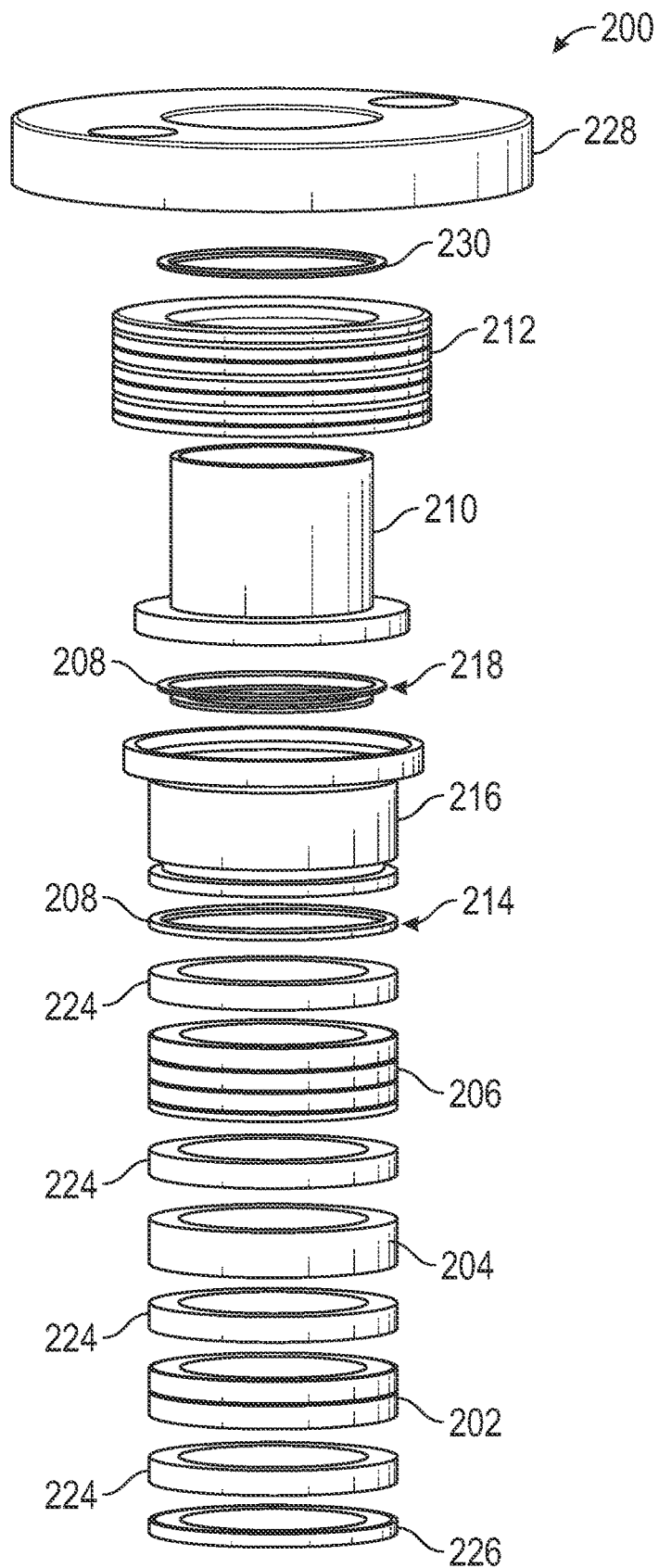
FIG. 4 is an exploded view of one of many embodiments of a shaft seal assembly according to the disclosure.
Figure 5:
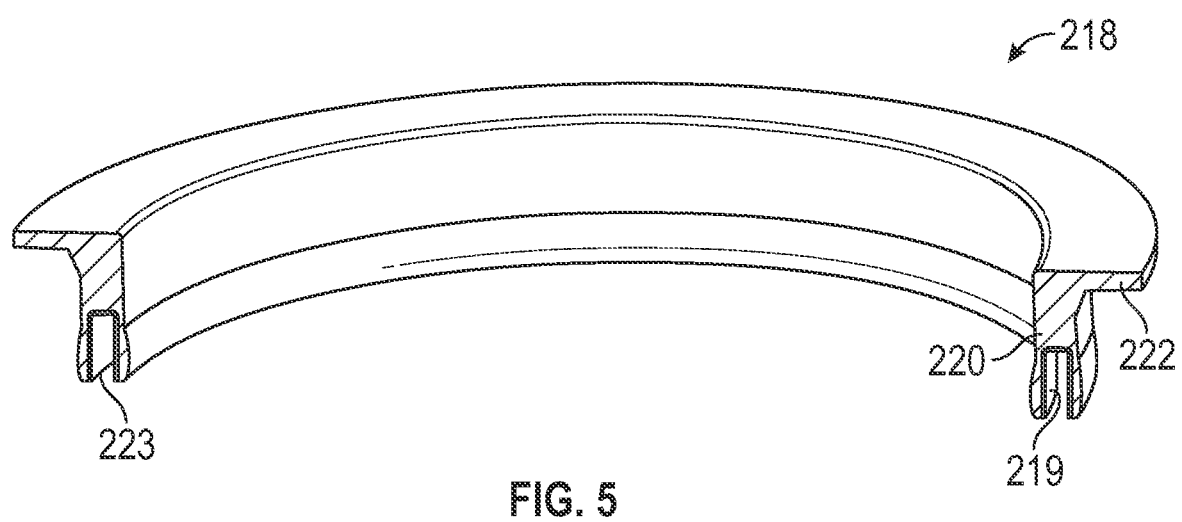
FIG. 5 is a perspective view of one of many embodiments of a packing follower seal according to the disclosure.

FIG. 1 is a sectional view of one of many embodiments of a valve according to the disclosure. FIG. 2 is a partial sectional view of one of many embodiments of a valve according to the disclosure. FIG. 3 is a perspective view of one of many embodiments of a shaft seal assembly according to the disclosure. FIG. 4 is an exploded view of one of many embodiments of a shaft seal assembly according to the disclosure. FIG. 5 is a perspective view of one of many embodiments of a packing follower seal according to the disclosure. FIGS. 1-5 are described in conjunction with one another.

In at least one embodiment, a valve 100 can include a valve body 102 having an inlet or input port 104 and an outlet or output port 106, a rotatable gate 108 to selectively block or control fluid flow along a flow path 105 between the input port 104 and the output port 106, a neck 110 extending from the valve body 102, a shaft 112 extending from the rotatable gate 108 and through the neck 110 (e.g., through a bore 107 of the neck 110), and a seal assembly 200 configured to rotatably seal the shaft 112 to the bore 107 or neck 110. In at least one embodiment, the valve 100 can be a quarter-turn segmented ball valve, for example, and shaft 112 can be configured to rotate about an axis, such as central longitudinal axis X, for selectively opening and closing gate 108 to control the flow of pressurized fluid (e.g., gas, liquid, vapor, or a combination thereof, which in at least some cases can include solid particles as well) through valve 100. In at least one embodiment, the rotatable gate 108 can be a segmented ball and/or provide the flow path between the input port 104 and the output port 106 in a first position and block the flow path between the input port 104 and the output port 106 in a second position. In at least one embodiment, the shaft 112 can rotate the rotatable gate 108 between the first position and the second position. In at least one embodiment, the shaft 112 can include a first end 114 disposed through a first end 115 of the neck 110 and connected to the rotatable gate 108, and a second end 116 extending beyond a second end 117 of the neck 110. In at least one embodiment, second end 116 of shaft 112 can be configured to couple with a valve actuator (not shown) for selectively rotating shaft 112 during valve operations, which can be or include any type of valve actuator required or desired for an implementation of the disclosure.

In at least one embodiment, the neck 110 can be threaded onto the body 102. In at least one embodiment, the neck 110 can be integral to the body 102. In at least one embodiment, the valve 100 can include a pin 118 to rotatably support the gate 108. In at least one embodiment, the valve 100 can also include a valve seat 120 and a seat 122 follower to hold the seat 120 in place.

In at least one embodiment, the seal assembly 200 can include a first stage seal 202 positioned on the shaft 112, a first guide bushing 204 adjacent to the first stage seal 202, a second stage seal 206 positioned on the shaft 112 adjacent to the first guide bushing 204, a third stage seal 208 positioned on the shaft 112 adjacent to the second stage seal 206, a second guide bushing 210 adjacent to the third stage seal 208, and one or more biasing devices, such as a spring 212 (e.g., a Belleville spring) coiled around the shaft 112 and configured to compress one or more of the seals 202, 206, 208, 214, 218, or any combination thereof. In at least one embodiment, the first guide bushing 204 and the second guide bushing 210 can cooperate to align the shaft within the neck.

In at least one embodiment, the first guide bushing 204 and/or the second guide bushing 210 can protect one or more of the seals 202, 206, 208, 214, 218 from one or more loads. For example, when spring 212 is compressed, an axial load with respect to the central longitudinal axis of shaft 112 can be transmitted to one or both of the first and second stage seals 202, 206. As a result, a uniform radial load can be produced between the shaft 112 and one or both of the first and second stage seals 202, 206. Nonetheless, due to the clearances often associated with the drive-train components (i.e., the shaft, bearings, and rotatable gate) and/or a flowing pressure drop, a shaft often can subject all three stages of seals to non-uniform radial loads during valve operations. However, guide bushings 204, 210 can help minimize the magnitude of these non-uniform radial loads. As will be appreciated by a person of ordinary skill in the art having the benefits of the present disclosure, minimizing non-uniform loads on one or more of the seals in the manners discussed above can advantageously extend the functional life thereof.

In at least one embodiment, the first stage seal 202 can rotatably seal the shaft 112 to the neck 110 when exposed to one or more temperatures during valve operations, such as one or more elevated temperatures resulting from heat transfer based on a relatively high operating temperature of the valve 100. For example, in at least one embodiment, the valve operating temperature or flow path operating temperature can be about 1000 degrees fahrenheit (° F.) or can exceed 1000 degrees fahrenheit (° F.), and heat from the flow path can be transferred, for example, in a direction from the first end 115 of the neck 110 towards the second end 117 of the neck 110, heating one or more components disposed within neck 110. In at least one embodiment, valve 100 can be advantageously configured for managing heat transfer under such conditions, for instance, to help maximize the effectiveness of one or more seals and/or to allow for utilization of cost effective components within seal assembly 200.

In at least one embodiment, neck 110 and one or more components of seal assembly 200, such as first stage seal 202 and second stage seal 206 can be advantageously spaced and configured for maximizing valve performance and minimizing the chance of fluid leakage through neck 110. For example, in at least one embodiment, neck 110 can dissipate heat (e.g., due to a relatively lower temperature of an atmosphere surrounding valve 100 versus the valve operating temperature) along its length and first stage seal 202 and second stage seal 206 can be sufficiently spaced from flow path 105 or valve body 102 (or another reference point) for limiting, controlling or otherwise accomplishing a desired operating temperature (or operating temperature range) to which each seal 202, 206 may be exposed during valve operations.

As illustrated in FIG. 2 for exemplary purposes, in at least one embodiment, first stage seal 202 can be disposed at a first stage seal location L1 located a first stage distance D1 from, e.g., shoulder 124 of neck 110, and second stage seal 206 can be disposed at a second stage seal location L2 located a second stage distance D2 from shoulder 124 of neck 110. Similarly, one or more additional seals can be disposed fluidically downstream of second stage seal 206 (i.e., between second stage seal 206 and second end 117 of neck 110, as depicted in the illustrative example of FIG. 2) and, as also illustrated in FIG. 2, the respective seals can be spaced from one another and/or from shoulder 124 via one or more of packing box ring 226, anti-extrusion rings 224, guide bushing 204, one or more other valve or seal assembly components according to a given implementation of the disclosure, or any combination thereof. Further, seal locations L1, L2 and distances D1, D2 can be chosen for accomplishing desired operating temperatures or ranges thereof for first stage seal 202 and second stage seal 206, respectively.

For instance, in at least one embodiment, which is but one of many, it can be desirable for first stage seal 202 to be or include a graphite sealing ring having a first working temperature (e.g., maximum continuous service temperature) and for second stage seal 206 to be or include a polymer or other sealing ring having a second working temperature lower than the first working temperature. For example, in at least one embodiment, a graphite sealing ring may perform well (or even best) within a working temperature range of 300° F. to 750° F. (i.e., at least about 300° F. to 750° F., inclusive), such as to be warm enough to minimize adhesive wear but not so warm as break down and lose sealing ability). Similarly, a polymer or other sealing ring may perform well with a working temperature up to at least about 300° F. or 400° F., although it can be desirable to limit such a working temperature to less than 300° F. or 400° F. in practice. Thus, in such an embodiment, wherein the operating temperature of the valve is around or above 1000° F., which is but one of many, first stage seal 202 can be disposed at a first stage seal location L1 located a first stage distance D1 from, e.g., shoulder 124 of neck 110, such that the operating temperature of first stage seal 202 during valve operations falls within the aforementioned working temperature range for a graphite sealing ring, and second stage seal 206 can be disposed at a second stage seal location L2 located a second stage distance D2 from shoulder 124 of neck 110 such that the operating temperature of second stage seal 206 during valve operations falls within the aforementioned working temperature range for a polymer or other sealing ring. In this manner, one or more embodiments of the disclosure can advantageously provide for the use of one or more relatively cheaper second (or third, etc.) stage seals fluidically downstream of a more expensive first stage seal, which can thereby reduce the overall cost of a given implementation of valve 100 or seal assembly 200 while maintaining desired functionality.

As will be appreciated by a person of ordinary skill in the art having the benefits of the present disclosure, the particular seal locations L1, L2 and distances D1, D2 can, and likely will, vary from one implementation of the disclosure to another based on relevant factors, such as, but not necessarily limited to, operating temperatures, material types, material thicknesses, valve component structures, and ambient temperature and conditions, among others. Nonetheless, such seal locations L1, L2 and distances D1, D2 can be determined for a given implementation using appropriate experimentation and/or modeling, such as trial and error, finite element analysis (FEA), thermal mapping, or combinations thereof.

In at least one embodiment, valve 100 can have an operating temperature of at least about 1000° F., and first stage seal 202, second stage seal 206, first and second stage seal locations L1, L2 and first and second stage distances D1, D2 can be configured such that, during valve operations, an operating temperature of first stage seal 202 can be limited to no more than 75% of the valve operating temperature (or about 750° F.) and an operating temperature of second stage seal 206 can be limited to no more than 45% of the valve operating temperature (or about 450° F.). In at least one embodiment, valve 100 can have an operating temperature of at least about 1000° F., and first stage seal 202, second stage seal 206, first and second stage seal locations L1, L2 and first and second stage distances D1, D2 can be configured such that, during valve operations, an operating temperature of first stage seal 202 can be limited to an operating temperature within the range of about 300° F. to about 750° F. In at least one embodiment, valve 100 can have an operating temperature of at least about 1000° F., and first stage seal 202, second stage seal 206, first and second stage seal locations L1, L2 and first and second stage distances D1, D2 can be configured such that, during valve operations, an operating temperature of second stage seal 206 can be limited to an operating temperature within the range of about 200° F. to about 450° F. In at least one embodiment, valve 100 can have an operating temperature of at least about 1000° F., and first stage seal 202, second stage seal 206, first and second stage seal locations L1, L2 and first and second stage distances D1, D2 can be configured such that, during valve operations, an operating temperature of first stage seal 202 can be greater than or equal to about 300° F. In at least one embodiment, valve 100 can have an operating temperature of at least about 1000° F., and first stage seal 202, second stage seal 206, first and second stage seal locations L1, L2 and first and second stage distances D1, D2 can be configured such that, during valve operations, an operating temperature of first stage seal 202 can be greater than or equal to about 300° F., and an operating temperature of second stage seal 206 can be less than or equal to the lesser of about 600° F. and the maximum continuous service temperature of second stage seal 206. In at least one embodiment, valve 100 can have an operating temperature of at least about 1000° F., first stage seal 202 can be a graphite sealing ring, second stage seal 206 can be a polymer dealing ring, and neck 110 can have a length of at least about 6 inches, such as between about 5 inches and about 7 inches, or of more than 6 inches.

In at least one embodiment, the first stage seal 202 can be a graphite sealing ring. In at least one embodiment, the second stage seal 206 can be or include a polymer sealing ring, such as a polytetrafluoroethylene sealing ring or a sealing ring of one or more other polymeric (or non-polymeric) materials having a working temperature less than the operating temperature of the valve (e.g., less than 1000° F.) and/or less than the working temperature of the first stage seal 202. For example, in at least one embodiment, the second stage seal 206 can be or include a sealing ring comprised of one or more commonly available polymeric and/or elastomeric materials, which often have upper working temperature limits in or about the range of 200° F. to 450° F. As another example, second stage seal 206 can be or include a sealing ring comprised of Kalrez™ perfluoroelastomer material, which can have an upper working temperature limit of or about 600° F. As yet another example, second stage seal 206 can be or include a sealing ring comprised of a combination of graphite and polytetrafluoroethylene (PTFE), which can have an upper working temperature limit of or about 750° F. Of course, the above-mentioned materials are but some examples of many, and second stage seal 206 can be or include a seal of any material(s) required or desired in accordance with an implementation of the disclosure.

In at least one embodiment, the first stage seal 202 can be a graphite sealing ring, the second stage seal 206 can be or include a first polytetrafluoroethylene sealing ring, the third stage seal 208 can be or include a second and/or a third polytetrafluoroethylene sealing ring, or any combination thereof. For example, in at least one embodiment, the third stage seal 208 can include a first follower seal 214 on an outer surface of a packing follower 216 and configured to seal the packing follower 216 to the neck 110, and a second follower seal 218 configured to seal the packing follower 216 to the shaft 112. In at least one embodiment, the second follower seal 218 can be or include a ring seal, such as a polymer ring seal, and can have one or more of an annular flange 220, a radially outwardly extending flange 222 and a groove 223 (see, e.g., FIG. 5), such as for sealingly engaging or otherwise coupling with one or more other components of the system. As another example, groove 223 can be exposed to fluid pressure during valve operations, which can increase sealing pressure between seal 218 and shaft 112, whether separately or in combination with one or more springs 219 incorporated into or otherwise coupled with seal 218.

In at least one embodiment, the first stage seal 202 can be configured to block or capture solid particles, thereby preventing the solid particles from reaching the second stage seal 206. In at least one embodiment, the first stage seal 202 can be configured to pass some quantity of gaseous material to the second stage seal 206. In at least one embodiment, any one or more of the seals 202, 206, 208, 214, 218 can be configured to block or capture gaseous material. For example, in at least one embodiment, the first stage seal 202 can be configured to protect the second stage seal 206 and/or the third stage seal 208 by blocking solid particles, thereby increasing the service life of the second stage seal 206 and/or the third stage seal 208, which can effectively block passage of gaseous material.

In at least one embodiment, one or more of the seals 202, 206, 208, 214, 218 can be or include a dynamic seal and one or more of the seals 202, 206, 208, 214, 218 can be or include a static seal. For example, as shown in the exemplary embodiment of FIGS. 2-4, which is but one of many, first follower seal 214 can be a static seal, in that it is configured to seal the packing follower 216 to the neck 110, and therefore sealingly engages components that do not move during valve operations (or which are at least substantially static once installed, i.e., subject to vibration and the like). As also shown in the exemplary embodiment of FIGS. 2-4, one or more of the remaining seals 202, 206, 208, 218 can be dynamic seals, in that such seals sealingly engage components that do move during valve operations, i.e., shaft 112.

In at least one embodiment, the seal assembly 200 can include one or more anti-extrusion rings for helping protect one or more of the seals 202, 206, 208, 214, 218 against damage during valve operations, such as by resisting or preventing extrusion of the seals into equipment clearances and/or otherwise supporting maintenance of proper seal shape and position. For example, in at least one embodiment, the seal assembly 200 can include an anti-extrusion ring 224 between the first stage seal 202 and the first guide bushing 204, an anti-extrusion ring 224 between the first guide bushing 204 and the second stage seal 206, an anti-extrusion ring 224 between the second stage seal 206 and the third stage seal 208, or any combination thereof.

In at least one embodiment, a valve 100 can include a valve body 102 having an input port 104 and an output port 106, a rotatable gate 108, a neck 110 extending from the valve body 102, a shaft 112 extending from the rotatable gate 108 and through the neck 110, and a seal assembly 200 to rotatably seal the shaft 112 to the neck 110. In at least one embodiment, the rotatable gate 108 can provide a flow path between the input port 104 and the output port 106 in a first position and block flow between the input port 104 and the output port 106 in a second position. In at least one embodiment, the neck 110 can include an internal shoulder 124. In at least one embodiment, the shaft 112 can rotate the rotatable gate 108 between the first position and the second position. In at least one embodiment, the shaft 112 can include a first end 114 connected to the rotatable gate 108 and a second end 116 extending beyond the neck 110.

In at least one embodiment, the seal assembly 200 can include a packing box ring 226 positioned on the shaft 112 adjoining the shoulder 124 of the neck 110, a first anti-extrusion ring 224 positioned on the shaft 112 adjoining the packing box ring 226, a first stage seal 202 positioned on the shaft 112 adjoining the first anti-extrusion ring 224, a second anti-extrusion ring 224 positioned on the shaft 112 adjoining the first stage seal 202, a first guide bushing 204 positioned on the shaft 112 adjoining the second anti-extrusion ring 224, a third anti-extrusion ring 224 positioned on the shaft 112 adjoining the first guide bushing 204, a second stage seal 206 positioned on the shaft 112 adjoining the third anti-extrusion ring 224, a fourth anti-extrusion ring 224 positioned on the shaft 112 adjoining the second stage seal 206, a packing follower 216 positioned on the shaft 112 adjoining the fourth anti-extrusion ring 224, a first follower seal 214 on an outer surface of the packing follower 216 and configured to seal the packing follower 216 to the neck 110, a second follower seal 218 configured to seal the packing follower 216 to the shaft 112, a second guide bushing 210 positioned on the shaft 112 adjoining the second follower seal 218 or the packing follower 216, a spring 212 coiled around the shaft 112 configured to compress one or more of the seals 202, 206, 208, 214, 218, and a packing flange 228 configured to compress the spring 212, or any combination thereof. As another example, in at least one embodiment, valve 100 or seal assembly 200 can include one or more O-rings 230 (see, e.g., FIG. 4) for holding spring 212 in place during assembly, such as by resisting longitudinal movement of spring 212 relative to shaft 112 during the assembly process.

In at least one embodiment, the first guide bushing 204 and/or the second guide bushing 210 can cooperate to align the shaft 112 within the neck 110. In at least one embodiment, the first guide bushing 204 and/or the second guide bushing 210 can protect one or more of the seals 202, 206, 208, 214, 218 from one or more loads, as described in more detail above. In at least one embodiment, the second guide bushing 210 and the packing follower 216 can be a single, integrally formed component. In at least one embodiment, the second guide bushing 210 and the packing follower 216 advantageously can be two, separate components, having second follower seal 218 sealingly coupled thereto or there between as described elsewhere herein and as shown for exemplary purposes in, e.g., FIG. 4. In such an embodiment, which is but one of many, such a two-piece configuration of the second guide bushing 210 and the packing follower 216 can advantageously provide for quick and easy replacement of one or more components, such as second follower seal 218, during valve operations. For example, in the event of a leak through seal assembly 200 during valve operations, the two-piece configuration of the second guide bushing 210 and the packing follower 216 can allow a user to gain ready access to repair or replace second follower seal 218 with minimal downtime and without need to remove one or more other components of seal assembly 200.

In at least one embodiment, the first stage seal 202 can comprise a graphite sealing ring and/or can have a working temperature between 300° F. and 750° F. In at least one embodiment, the second stage seal 206 and/or the third stage seal 208 can have working temperatures less than the working temperature of the first stage seal, which can include the second and third stage seals having working temperatures that are the same or different from one another. For example, in at least one embodiment, the second stage seal 206 and/or the third stage seal 208 can be or include graphite composite or polymer sealing rings, whether separately or in combination. In general, graphite composite sealing rings can be suitable for implementations of the disclosure wherein working temperatures up to or about 750° F. may be needed or desired, whereas polymer sealing rings can be suitable for implementations involving relatively lower maximum working temperatures (see, e.g., the temperature ranges discussed in more detail above).

In at least one embodiment, the first stage seal 202 can be configured to block or capture solid particles, or otherwise prevent the solid particles from reaching the second stage seal 206, such as by way of being comprised of graphite or another relatively hard material for filtering out such solid particles prior to their reaching a relatively softer polymer or other downstream seal. In at least one embodiment, the first stage seal 202 can be configured to pass limited gaseous material to the second stage seal 206. In at least one embodiment, the second follower seal 218 can comprise a polymer ring having an annular flange 220 and an outwardly extending flange 222.

In at least one embodiment, a valve can include a valve body having an input port, an output port and a flow path there between, a rotatable gate, wherein the rotatable gate allows flow between the input port and the output port in a first position and blocks flow between the input port and the output port in a second position, a neck extending from the valve body, wherein the neck has a first end coupled to the valve body, a second end longitudinally opposite the first end, a bore, and an internal shoulder, a shaft disposed through the bore of the neck, wherein the shaft has a central longitudinal axis, a first end coupled to the rotatable gate and a second end longitudinally opposite the first end of the shaft, and wherein the shaft can be selectively operable to rotate the rotatable gate between the first position and the second position, and a seal assembly configured to rotatably seal the shaft to the neck. In at least one embodiment, a seal assembly can include a first stage seal having a first working temperature, wherein the first stage seal is sealingly coupled to the shaft at a first stage seal location located a first stage distance from the internal shoulder of the neck, and a second stage seal having a second working temperature, wherein the second stage seal is sealingly coupled to the shaft at a second stage seal location located a second stage distance from the internal shoulder of the neck. The second stage distance can be greater than the first stage distance, and the first working temperature can be higher than the second working temperature. The first stage distance, the second stage distance and the first stage seal can be collectively configured to at least partially prevent a second stage operating temperature at the second stage seal location from exceeding the second working temperature.

In at least one embodiment, the first and second working temperatures can be the maximum continuous service temperatures of the first and second stage seals, respectively. In at least one embodiment, the valve can have a flow path operating temperature of at least 1000 degrees fahrenheit within the flow path, and the first stage distance can be configured to maintain, at the first stage seal location, a first stage operating temperature of at least 300 degrees fahrenheit. In at least one embodiment, the first stage distance, the second stage distance and the first stage seal can be collectively configured to prevent the second stage operating temperature at the second stage seal location from exceeding 400 degrees fahrenheit.

In at least one embodiment, the first stage seal can include a graphite sealing ring and the second stage seal can include a polymer sealing ring. In at least one embodiment, the first stage seal can be closer to the internal shoulder of the neck than any other seal of the seal assembly. In at least one embodiment, a packing box ring can be disposed about the shaft longitudinally between the first stage seal and the internal shoulder of the neck. In at least one embodiment, a first guide bushing can be disposed about the shaft longitudinally between the first stage seal and the second stage seal.

In at least one embodiment, a valve or seal assembly can include a packing follower disposed about the shaft longitudinally between the second stage seal and the second end of the neck, and a second guide bushing disposed about the shaft longitudinally between the packing follower and the second end of the neck. The first guide bushing and the second guide bushing can be configured to cooperate to align the shaft within the neck. In at least one embodiment, the second guide bushing can have a lower end configured to couple with an upper end of the packing follower. In at least one embodiment, one of the lower end of the second guide bushing and the upper end of the packing follower can include an outwardly extending flange and the other of the lower end of the second guide bushing and the upper end of the packing follower can include a seat configured to receive at least a portion of the outwardly extending flange.

In at least one embodiment, a valve or seal assembly can include a third stage seal. The third stage seal can include a third stage dynamic seal sealingly coupled to the shaft, and the seal assembly can be configured to compress at least a portion of the third stage dynamic seal between the lower end of the second guide bushing and the upper end of the packing follower. In at least one embodiment, the third stage dynamic seal can include a ring seal having an outwardly extending flange, and the outwardly extending flange can be configured to sealingly engage the lower end of the second guide bushing and the upper end of the packing follower.

In at least one embodiment, a ring seal can include an annular flange that extends downwardly from the outwardly extending flange. In at least one embodiment, the annular flange can include a downwardly facing end and an annular groove disposed in the downwardly facing end, and the downwardly facing groove can be disposed within a bore of the packing follower and in fluid communication with a pressurized fluid downstream of the second stage seal. In at least one embodiment, the third stage seal can include a third stage static seal sealingly coupled to a radially outside surface of the packing follower and a radially inside surface of the bore of the neck.

In at least one embodiment, a valve or seal assembly can include a third stage dynamic seal having a third working temperature. The third stage dynamic seal can be sealingly coupled to the shaft at a third stage seal location located a third stage distance from the internal shoulder of the neck, and the third stage distance can be greater than the second stage distance. In at least one embodiment, the first working temperature can be higher than the third working temperature, and the first stage distance, the second stage distance, the third stage distance, the first stage seal and the second stage seal can be collectively configured to prevent a third stage operating temperature at the third stage seal location from exceeding the third working temperature. In at least one embodiment, the third working temperature can be less than or equal to the second working temperature.

In at least one embodiment, a valve or seal assembly can include one or more springs disposed about a radially outside surface of the second guide bushing and configured to be longitudinally compressed between at least a portion of the second guide bushing and a packing flange coupled to the second end of the neck. In at least one embodiment, a spring can be a Belleville spring. In at least one embodiment, the spring, the first guide bushing and the second guide bushing can be configured to cooperate to translate an axial load into a uniform radial load acting on at least one of the first stage seal, the second stage seal and a combination thereof. In at least one embodiment, a valve or a seal assembly can include one or more anti-extrusion rings disposed about the shaft. One or more anti-extrusion rings can include an anti-extrusion ring disposed at least one of longitudinally between the first stage seal and the internal shoulder of the neck, longitudinally between the first stage seal and the second stage seal, longitudinally between the second stage seal and the second end of the neck, and a combination thereof.

In at least one embodiment, a valve can include a valve body having an input port and an output port, a rotatable gate to selectively provide and block a flow path between the input port and the output port, a neck extending from the valve body, a shaft extending from the rotatable gate and through the neck, and a seal assembly configured to rotatably seal the shaft to the neck. In at least one embodiment, the rotatable gate can provide the flow path between the input port and the output port in a first position and block the flow path between the input port and the output port in a second position. In at least one embodiment, the shaft can rotate the rotatable gate between the first position and the second position. In at least one embodiment, the shaft can include a first end connected to the rotatable gate and a second end extending beyond the neck.

In at least one embodiment, the seal assembly can include a first stage seal positioned on the shaft, a first guide bushing adjacent to the first stage seal, a second stage seal positioned on the shaft adjacent to the first guide bushing, a third stage seal positioned on the shaft adjacent to the second stage seal, a second guide bushing adjacent to the third stage seal, a spring coiled around the shaft configured to compress one or more of the seals, or any combination thereof. In at least one embodiment, the first guide bushing and the second guide bushing can cooperate to align the shaft within the neck. In at least one embodiment, the first guide bushing and the second guide bushing can protect the first stage seal, the second stage seal, and the third stage seal from one or more loads.

In at least one embodiment, the first stage seal can rotatably seal the shaft to the neck when exposed to an operating temperature of the valve. In at least one embodiment, the operating temperature can be at least 1000 degrees fahrenheit. In at least one embodiment, the neck can dissipate heat, such that the second stage seal is exposed to no more than 75% of the operating temperature. In at least one embodiment, the first stage seal can be a graphite sealing ring. In at least one embodiment, the second stage seal can be a polymer sealing ring having a working temperature less than the operating temperature. For example, in at least one embodiment, the second stage seal can be a polytetrafluoroethylene sealing ring.

In at least one embodiment, the first stage seal can be a graphite sealing ring, the second stage seal can be a first polytetrafluoroethylene sealing ring, the third stage seal can be a second polytetrafluoroethylene sealing ring, or any combination thereof. In at least one embodiment, the third stage seal can include a polymer ring having an annular flange and an outwardly extending flange. In at least one embodiment, the first stage seal can be configured to capture solid particles, thereby preventing the solid particles from reaching the second stage seal. In at least one embodiment, the first stage seal can be configured to pass gaseous material to the second stage seal. In at least one embodiment, the seal assembly can include a first anti-extrusion ring between the first stage seal and the first guide bushing, a second anti-extrusion ring between the first guide bushing and the second stage seal, a third anti-extrusion ring between the second stage seal and the third stage seal, or any combination thereof.

In at least one embodiment, a valve can include a valve body having an input port and an output port, a rotatable gate, a neck extending from the valve body, a shaft extending from the rotatable gate and through the neck, and a seal assembly to rotatably seal the shaft to the neck. In at least one embodiment, the rotatable gate can provide a flow path between the input port and the output port in a first position and block flow between the input port and the output port in a second position. In at least one embodiment, the neck can include an internal shoulder. In at least one embodiment, the shaft can rotate the rotatable gate between the first position and the second position. In at least one embodiment, the shaft can include a first end connected to the rotatable gate and a second end extending beyond the neck.

In at least one embodiment, the seal assembly can include a packing box ring positioned on the shaft adjoining the shoulder of the neck, a first anti-extrusion ring positioned on the shaft adjoining the packing box ring, a first stage seal positioned on the shaft adjoining the first anti-extrusion ring, a second anti-extrusion ring positioned on the shaft adjoining the first stage seal, a first guide bushing positioned on the shaft adjoining the second anti-extrusion ring, a third anti-extrusion ring positioned on the shaft adjoining the first guide bushing, a second stage seal positioned on the shaft adjoining the third anti-extrusion ring, a fourth anti-extrusion ring positioned on the shaft adjoining the second stage seal, a packing follower positioned on the shaft adjoining the fourth anti-extrusion ring, a first follower seal on an outer surface of the packing follower and configured to seal the packing follower to the neck, a second follower seal configured to seal the packing follower to the shaft, a second guide bushing positioned on the shaft adjoining the second follower seal or the packing follower, a spring coiled around the shaft configured to compress one or more of the seals, a packing flange configured to compress the spring, or any combination thereof.

In at least one embodiment, the first guide bushing and/or the second guide bushing can cooperate to align the shaft within the neck. In at least one embodiment, the first guide bushing and/or the second guide bushing can protect the first stage seal and/or the second stage seal from one or more loads. In at least one embodiment, the first stage seal can comprise a graphite sealing ring and/or can have a working temperature up to at least about 750 degrees fahrenheit. In at least one embodiment, the second stage seal and/or the third stage seal can comprise a polymer or other sealing ring having a working temperature less than the working temperature of the first stage seal. In at least one embodiment, the first stage seal can be configured to capture solid particles, or otherwise prevent the solid particles from reaching the second stage seal. In at least one embodiment, the first stage seal can be configured to pass gaseous material to the second stage seal. In at least one embodiment, the second follower seal can comprise a polymer ring having an annular flange and an outwardly extending flange.

Other and further embodiments utilizing one or more aspects of the disclosure can be devised without departing from the spirit of Applicant's disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicant, but rather, in conformity with the patent laws, Applicant intends to fully protect all such modifications and improvements that come within the scope or range of equivalents of the following claims.

What is claimed is:

1. A valve, comprising:
a valve body having an input port, an output port and a flow path there between;
a rotatable gate, wherein the rotatable gate allows flow between the input port and the output port in a first position and blocks flow between the input port and the output port in a second position;
a neck extending from the valve body, wherein the neck has a first end coupled to the valve body, a second end longitudinally opposite the first end, a bore, and an internal shoulder;
a shaft disposed through the bore of the neck, wherein the shaft has a central longitudinal axis, a first end coupled to the rotatable gate and a second end longitudinally opposite the first end of the shaft, and wherein the shaft is selectively operable to rotate the rotatable gate between the first position and the second position; and
a seal assembly configured to rotatably seal the shaft to the neck, wherein the seal assembly comprises
a first stage seal having a first working temperature, wherein the first stage seal is sealingly coupled to the shaft at a first stage seal location located a first stage distance from the internal shoulder of the neck; and
a second stage seal having a second working temperature, wherein the second stage seal is sealingly coupled to the shaft at a second stage seal location located a second stage distance from the internal shoulder of the neck;
wherein the second stage distance is greater than the first stage distance;
wherein the first working temperature is higher than the second working temperature; and
wherein the first stage distance, the second stage distance and the first stage seal are collectively configured to prevent a second stage operating temperature at the second stage seal location from exceeding the second working temperature; and
wherein the internal shoulder of the neck is positioned between the first stage seal and the rotatable gate.

2. The valve of claim 1, wherein the first and second working temperatures are the maximum continuous service temperatures of the first and second stage seals, respectively.

3. The valve of claim 1, wherein the valve has a flow path operating temperature of at least 1000 degrees Fahrenheit within the flow path, and wherein the first stage distance is configured to maintain, at the first stage seal location, a first stage operating temperature of at least 300 degrees Fahrenheit.

4. The valve of claim 3, wherein the first stage distance, the second stage distance and the first stage seal are collectively configured to prevent the second stage operating temperature at the second stage seal location from exceeding 400 degrees Fahrenheit.

5. The valve of claim 1, wherein the first stage seal comprises a graphite sealing ring and the second stage seal comprises a polymer sealing ring.

6. The valve of claim 1, wherein the first stage seal is closer to the internal shoulder of the neck than any other seal of the seal assembly.

7. The valve of claim 6, further comprising a packing box ring disposed about the shaft longitudinally between the first stage seal and the internal shoulder of the neck.

8. The valve of claim 1, further comprising
a third stage dynamic seal having a third working temperature, wherein the third stage dynamic seal is sealingly coupled to the shaft at a third stage seal location located a third stage distance from the internal shoulder of the neck;
wherein the third stage distance is greater than the second stage distance;
wherein the first working temperature is higher than the third working temperature; and
wherein the first stage distance, the second stage distance, the third stage distance, the first stage seal and the second stage seal are collectively configured to prevent a third stage operating temperature at the third stage seal location from exceeding the third working temperature.

9. The valve of claim 8, wherein the third working temperature is less than or equal to the second working temperature.

10. The valve of claim 1, wherein the internal shoulder of the neck is located adjacent to the first end of the neck.

11. A valve, comprising:
a valve body having an input port, an output port and a flow path there between;
a rotatable gate, wherein the rotatable gate allows flow between the input port and the output port in a first position and blocks flow between the input port and the output port in a second position;
a neck extending from the valve body, wherein the neck has a first end coupled to the valve body, a second end longitudinally opposite the first end, a bore, and an internal shoulder;
a shaft disposed through the bore of the neck, wherein the shaft has a central longitudinal axis, a first end coupled to the rotatable gate and a second end longitudinally opposite the first end of the shaft, and wherein the shaft is selectively operable to rotate the rotatable gate between the first position and the second position; and
a seal assembly configured to rotatably seal the shaft to the neck, wherein the seal assembly comprises
a first stage seal having a first working temperature, wherein the first stage seal is sealingly coupled to the shaft at a first stage seal location located a first stage distance from the internal shoulder of the neck;
a second stage seal having a second working temperature, wherein the second stage seal is sealingly coupled to the shaft at a second stage seal location located a second stage distance from the internal shoulder of the neck;
wherein the second stage distance is greater than the first stage distance;
wherein the first working temperature is higher than the second working temperature; and
wherein the first stage distance, the second stage distance and the first stage seal are collectively configured to prevent a second stage operating temperature at the second stage seal location from exceeding the second working temperature;

a first guide bushing disposed about the shaft longitudinally between the first stage seal and the second stage seal;

a packing follower disposed about the shaft longitudinally between the second stage seal and the second end of the neck; and a second guide bushing disposed about the shaft longitudinally between the packing follower and the second end of the neck;

wherein the first guide bushing and the second guide bushing are configured to cooperate to align the shaft within the neck.

12. The valve of claim 11, wherein the second guide bushing has a lower end configured to couple with an upper end of the packing follower.

13. The valve of claim 12, wherein one of the lower end of the second guide bushing and the upper end of the packing follower comprises an outwardly extending flange and the other of the lower end of the second guide bushing and the upper end of the packing follower comprises a seat configured to receive at least a portion of the outwardly extending flange.

14. The valve of claim 13, further comprising a third stage seal, wherein the third stage seal comprises a third stage dynamic seal sealingly coupled to the shaft, and wherein the seal assembly is configured to compress at least a portion of the third stage dynamic seal between the lower end of the second guide bushing and the upper end of the packing follower.

15. The valve of claim 14, wherein the third stage dynamic seal comprises a ring seal having an outwardly extending flange, and wherein the outwardly extending flange is configured to sealingly engage the lower end of the second guide bushing and the upper end of the packing follower.

16. The valve of claim 15, wherein the ring seal further comprises an annular flange that extends downwardly from the outwardly extending flange.

17. The valve of claim 16, wherein the annular flange comprises a downwardly facing end and an annular groove disposed in the downwardly facing end, and wherein the downwardly facing groove is disposed within a bore of the packing follower and in fluid communication with a pressurized fluid downstream of the second stage seal.

18. The valve of claim 14, wherein the third stage seal further comprises a third stage static seal sealingly coupled to a radially outside surface of the packing follower and a radially inside surface of the bore of the neck.

19. The valve of claim 11, further comprising a spring disposed about a radially outside surface of the second guide bushing and configured to be longitudinally compressed between at least a portion of the second guide bushing and a packing flange coupled to the second end of the neck.

20. The valve of claim 19, wherein the spring is a Belleville spring, and wherein the Belleville spring, the first guide bushing and the second guide bushing are configured to cooperate to translate an axial load into a uniform radial load acting on at least one of the first stage seal, the second stage seal and a combination thereof.

* * * * *